United States Patent [19]

Meyer

[11] Patent Number: 4,483,963
[45] Date of Patent: Nov. 20, 1984

[54] HARDENABLE/CURABLE UNSATURATED POLYESTER BASED COMPOSITIONS

[75] Inventor: Jacques Meyer, Paris, France

[73] Assignee: Chloe Chimie, Puteaux, France

[21] Appl. No.: 506,776

[22] Filed: Jun. 22, 1983

[30] Foreign Application Priority Data

Jun. 30, 1982 [FR] France ............................. 82 11449

[51] Int. Cl.³ ............................................. C08L 67/06
[52] U.S. Cl. ......................................... 525/44; 525/48; 523/527
[58] Field of Search ........................... 525/44, 48, 444

[56] References Cited

U.S. PATENT DOCUMENTS

| | | | |
|---|---|---|---|
| 2,882,256 | 4/1959 | Waychoff | 525/48 |
| 3,766,129 | 10/1973 | Pesez | 523/514 |
| 4,229,559 | 10/1980 | Cotter | 525/48 |
| 4,263,413 | 4/1981 | Gardner | 525/48 |
| 4,293,686 | 10/1981 | Gardner | 525/48 |
| 4,316,835 | 2/1983 | Gardner | 525/48 |

FOREIGN PATENT DOCUMENTS 56-053120 5/1981 Japan .

Primary Examiner—John C. Bleutge
Assistant Examiner—Patricia Short
Attorney, Agent, or Firm—Burns, Doane, Swecker & Mathis

[57] ABSTRACT

Storage stable, polyester based compositions well adapted for hardening into molded shaped articles exhibiting virtually no shrinkage, are comprised of (i) an unsaturated polyester, (ii) a polymerizable, ethylenically unsaturated monomer copolymerizable therewith, (iii) an oligoester of the formula:

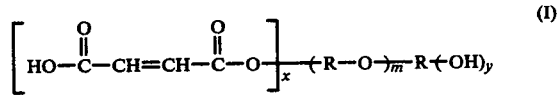

and (iv) a condensate of such oligoester (I) with an unsaturated polyester.

14 Claims, No Drawings

HARDENABLE/CURABLE UNSATURATED POLYESTER BASED COMPOSITIONS

FIELD AND SUMMARY OF THE INVENTION

The present invention relates to novel compositions of matter comprised of a polyester and a cross-linking monomer therefor, and, more especially, relates to curable such compositions comprised of:
(i) an unsaturated polyester;
(ii) a polymerizable, ethylenically unsaturated monomer copolymerizable therewith; and
(iii) an oligoester of the formula:

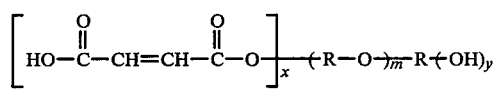
(I)

in which the average value of x ranges from 1.5 to 2, y is equal to 2-x, R, which can vary from one recurring unit to the next, represents a linear or branched chain aliphatic radical having from 2 to 4 carbon atoms, and m is such that the number-average molecular weight of the polyether-polyol (II), HO—R—$O_m$—ROH, ranges from 500 to 4,000, and which novel compositions are characterized in that same also comprise (iv) a condensate resulting from the reaction of an oligoester of the formula (I) with an unsaturated polyester.

DETAILED DESCRIPTION OF THE INVENTION

More particularly according to this invention, the aforementioned condensate can result from the reaction of an oligoester of the formula I, having an acid number in an aqueous medium and an acid number in an alcoholic medium ranging from 25 to 100 and preferably from 40 to 70, these numbers differing from one another by at most 5, with an unsaturated polyester having a hydroxyl number ranging from 20 to 80 and an average (number-average) molecular weight ranging from 1,000 to 5,000, at between 170° and 220° C., for a period which can range from 3 to 7 hours depending upon the nature of the reactants and the temperature selected. This unsaturated polyester can be used by itself or, for reasons of ease of processing of the reactants, it can advantageously be used in the form of a solution in a polymerizable, ethylenically unsaturated monomer, it being possible for the said solution to contain 30 to 70% by weight of unsaturated polyester.

The condensate above-described, which preferably was an acid number ranging from 20 to 40, is advantageously used in an amount of 0.5 to 5% of the weight of the composition defined by its constituents (i), (ii) and (iii).

The unsaturated polyester employed as the constituent (i) in the compositions according to the invention is advantageously selected from among polyesters having an acid number in an alcoholic medium ranging from 10 to 75 and more preferably from 15 to 40, a hydroxyl number ranging from 20 to 80 and an average (number-average) molecular weight ranging from 1,000 to 5,000.

The polyester used as constituent (i) and the polyester used for the preparation of the condensate with the oligoester can be selected from among the numerous polymers resulting from the polycondensation of at least one polycarboxylic derivative with at least one polyol, at least one of the reactants comprising a carbon-carbon double bond of ethylenic type. By the expression "polycarboxylic derivative", there are intended acids, esters of lower alcohols, acid chlorides and anhydrides. If several polyacids or polyols are used, it suffices for one of the reactants of a given family, for example, one of the polyacids, to comprise an ethylenic double bond. By way of illustration of the compounds which advantageously are used for the preparation of the polyesters, these compounds being more precisely difunctional (diacids or diols), acids which are particularly representative are maleic, chloromaleic, bromomaleic, fumaric, chlorofumaric, bromofumaric, mesaconic, citraconic, itaconic, malonic, succinic, glutaric, sebacic, isophthalic, naphthalenedicarboxylic, cyclohexane-1,4-dicarboxylic, endomethylenetetrahydrophthalic and endomethylenehexachlorophthalic acids; diols which are particularly representative are ethylene glycol, propylene glycol, butylene-1,2-glycol, diethylene glycol, triethylene glycol, tetraethylene glycol, neopentylglycol, polymethylene glycols and, in particular, trimethylene, tetramethylene, pentamethylene, hexamethylene, heptamethylene and octamethylene glycols. It is of course possible to use a small proportion of a compound containing more than two hydroxyl groups, such as trimethylolpropane or pentaerythritol.

The conditions for the preparation of the unsaturated polyesters are well described in the literature and do not circumscribe an object of this invention. Reference may be made, for example, to Kirk Othmer, *Encyclopedia of Chemical Technology*.

Exemplary of the polyesters, particularly representative are the polyesters obtained from an acid component comprising maleic anhydride, either alone or in admixture with isophthalic acid.

Exemplary of the ethylenically unsaturated monomers, representative are styrene, alpha-methylstyrene, vinyltoluene, p-(alpha-methylvinyl)-benzophenone, divinylbenzene, vinyl 2-chloroethyl ether, N-vinylpyrrolidone, 2-vinylpyridine, indene, methyl acrylate, methyl methacrylate, acrylamide, N-t-butylacrylamide, acrylonitrile, hexahydrotriacrylo-1,3,5-s-triazine, allyl phthalate, allyl fumarate, allyl cyanurate, allyl phosphate, diethylene glycol diallylcarbonate, allyl lactate, allyl malonate, allyl tricarballylate, allyl trimesate and allyl trimellitate.

The polymerizable monomer typically comprises from 10 to 60% of the weight of the polyester/monomer together.

The third constituent is the oligoester of the formula (I). This oligoester results from the reaction of maleic anhydride with a polyether-polyol (II). Preferred are those oligoesters obtained from polyols of the formula (II) having a number-average molecular weight ranging from 1,000 to 4,000, said oligoesters having an acid number in an aqueous medium and an acid number in an alcoholic medium ranging from 25 to 100 and preferably from 40 to 70, the difference between the aqueous acid number and the alcoholic acid number, for the same oligoester, preferably being at most 5.

The polyether/polyol is preferably selected from among polyethylene glycols, polypropylene glycols, poly(oxyethyleneoxypropylene) glycols and polyoxytetramethylene glycols having the average molecular weight indicated above. The preparation of these polyether-polyols is also widely described in the literature and too does not form an object of this invention.

In general, from 1.7 to 2 mols of maleic anhydride are used per mol of polyol (II). The reaction is advantageously carried out at between 50° and 100° C. and in the presence of a catalyst system such as lithium carbonate, tin compounds, such as salts or oxides, or amines, in particular secondary or tertiary amines.

In general, from 0.02 to 2% by weight of catalyst is used, relative to the weight of the maleic anhydride/polyol together.

The oligoester of the formula (I) is generally used in a proportion which can reach 30% by weight, relative to the weight of the polyester+ethylenic monomer together. Preferably, this proportion ranges from 5 to 25%.

The compositions according to the invention can be used for the preparation of molding compositions, which can contain at least one of the following additives: thickeners, fillers, reinforcing fibers, catalysts, polymerization inhibitors and the like. Such molding compositions circumscribe another object of the invention.

The thickener can advantageously be selected from among the oxides or hydroxides, of magnesium and calcium, and more generally from among the oxides and hydroxides of the elements of Groups I and II of the Periodic Table of the elements.

The amount of the thickener or thickeners advantageously ranges from 0.05 to 3% by weight of the weight of the polyester and monomer together.

The fillers can be selected from among the numerous known additives of this type. By way of example, representative are clay, talc, calcium carbonate, silica, glass microbeads, titanium dioxide and carbon black. The amount of filler generally represents 5 to 70% of the total weight of the composition.

The reinforcing material advantageously consists of glass fibers. However, it is possible to use other fibers, which either may or may not be associated with the glass fibers, such as mineral fibers (asbestos), metal fibers, carbon fibers, natural fibers (hemp, cotton) and synthetic polymer fibers (polyamides, polyesters). When they are incorporated into the molding compositions, in an amount typically ranging from 5 to 70% of the total weight of the composition, the fibers generally have a length on the order of 5 to 20 mm. The compositions can also be used to impregnate fibers, in which case the length of the fibers can reach 50 mm or more.

The compositions generally contain a catalyst selected from among compounds which generate free radicals (for example, peroxide compounds, such as benzoyl peroxide, t-butyl peroxide, lauroyl peroxide and t-butyl peroctoate).

It is also possible to use a polymerization inhibitor, in an amount ranging from about 30 to about 600 parts per million, relative to the weight of the polyester+monomer+oligoester together (for example, hydroquinone or p-benzoquinone), and a mold release agent, such as metal stearates, for example, zinc, aluminum and calcium stearates.

The compositions according to the invention make it possible to prepare molding compositions which can be shaped into articles virtually free of shrinkage. The molded shaped articles thus obtained not only reproduce perfectly the profile or relief of the mold in which they have been made, but also have excellent surface properties.

Furthermore, the condensate of the oligoester with the unsaturated polyester imparts to the compositions a marked stability over time: this condensate in fact plays a very effective role in making the constituents of these compositions compatible, in particular the polyester, the polymerizable monomer and the oligoester.

In order to further illustrate the present invention and the advantages thereof, the following specific examples are given, it being understood that same are intended only as illustrative and in nowise limitative.

EXAMPLES 1 AND 2

(1) Polyesters:

(i) A polyester was prepared from the following materials:
  (a) Maleic anhydride 0.6 mol;
  (b) Isophthalic acid 0.4 mol;
  (c) Diethylene glycol 0.35 mol; and
  (d) Propylene glycol 0.70 mol.

The resulting polyester had an acid number of 20, a hydroxyl number of 30 and a number-average molecular weight of 2,200.

This polyester was dissolved in styrene (40 parts of styrene per 60 parts of polyester). The solution obtained (Resin 1 below) had a viscosity of 10 poises at 25° C.

(ii) A polyester was prepared from:
  (a) Maleic anhydride 1 mol; and
  (b) Propylene glycol 1.1 mols.

The resulting polyester had an acid number of 35, a hydroxyl number of 58 and a number-average molecular weight of 1,200.

This polyester was dissolved in styrene (40 parts of styrene per 60 parts of polyester). The solution obtained (Resin 2 below) had a viscosity of 8 poises at 25° C.

(2) Oligoester:

Two mols of maleic anhydride were added to one mol of polyoxytetramethylene glycol (number-average molecular weight: 2,000) melted beforehand at 80° C. The reaction was carried out at 80° C. for 8 hours, in the presence of 0.1% by weight of lithium carbonate. The product obtained recrystallized slowly and had a melting point of 34° C., an aqueous acid number of 55 and an alcoholic acid number of 52.

(3) Condensate:

650 g of poly-(propylene glycol) fumarate (acid number 24, hydroxyl number 49, number-average molecular weight 1,500) and 150 g of the oligoester described under (2) were heated at 180° C. for 5 hours, under a nitrogen atmosphere. The polyester was used in the form of a 65% strength by weight solution in styrene. The condensate had a final acid number of 30.

(4) Formulation:

A series of compositions were prepared which contained:
  (i) 5.5 g of zinc stearate;
  (ii) 1.15 g of t-butyl peroctoate;
  (iii) 1.20 g of calcined magnesia;
  (iv) 8.50 g of white concentrate; and also:
  (v) 100 g of resin 1 or 2;
  (vi) x g of oligoester;
  (vii) y g of additional styrene;
  (viii) z g of calcium carbonate; and
  (ix) $(100+x+y)\times 0.02$ g of the condensate described under (3).

The oligoester was introduced in the molten state into the resin 1 or 2.

The various products were intimately admixed for 10 minutes under vigorous agitation.

(5) Properties:
(I) Stability of the compositions;

It was observed that the formulations described under (4) had a marked storage stability for several months, for the following values of x, y and z:

x = 10 and 15
y = 0.5, 18 and 25
z = 0.85, 150 and 220

This stability was characterized by the fact that the compositions, either containing or not containing any fillers (z), do not separate into two layers, one of the layers being rich in polyester and the other layer being rich in oligoester, it being possible to observe this separation during the prolonged storage of compositions not containing the condensate.

(II) Linear shrinkage:

The compositions described in the previous paragraph were used to impregnate glass fibers (average diameter 14 microns, average length, 30 mm) arranged omnidirectionally on a polyethylene film. The entire substrate was covered with a second polyethylene film and passed under calendering rollers to remove the air bubbles and to improve the impregnation of the glass fibers.

The preimpregnated material contained 28% by weight of glass, for a total weight of 6 kg/m².

The material was permitted to stand for 3 hours at 25° C. It was then placed under a press (2 mm at 140° C.).

The linear shrinkage was evaluated on a disc of molded material of diameter 150 mm (difference between the diameter of the mold and the diameter of the molded article, relative to the diameter of the mold and expressed in $°/_{oo}$).

It was found that the linear shrinkage was:

(a) 0.13 parts $°/_{oo}$ for a composition containing resin 15 g of oligoester, 18 g of additional styrene and 220 g of fillers (calcium carbonate);

(b) 0.86 $°/_{oo}$ for an identical composition, except for the fillers (85 g instead of 220 g);

(c) 0.86 $°/_{oo}$ for a composition containing resin 1, 85 g of fillers and 15 g of oligoester; and (d) 2.25 $°/_{oo}$ for the same composition but not containing the oligoester.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A hardenable, polyester based composition of matter comprising:

(i) an unsaturated polyester;
(ii) a polymerizable, ethylenically unsaturated monomer;
(iii) an oligoester of the formula:

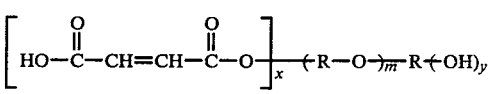

(I)

in which the average value of x ranges from 1.5 to 2, y is equal to 2-x, R, which can vary from one recurring unit to the next, represents a linear or branched chain aliphatic radical having from 2 to 4 carbon atoms, and m is such that the number-average molecular weight of the polyether-polyol (II), HO R—$O_m$ ROH, ranges from 500 to 4,000 and (iv) a condensate comprising the reaction product of an oligoester of the formula (I) with an unsaturated polyester at a temperature ranging from 170° to 220° C. for a period of time ranging from 3 to 7 hours.

2. The composition of matter as defined by claim 1, wherein the condensate (iv) comprises the reaction product of an oligoester of the formula (I) having an acid number in an aqueous medium and an acid number in an alcoholic medium ranging from 25 to 100, said two acid numbers differing from one another by at most 5, with an unsaturated polyester having a hydroxyl number ranging from 20 to 80 and a number-average molecular weight ranging from 1,000 to 5,000.

3. The composition of matter as defined by claim 2, wherein the condensate (iv) has an acid number ranging from 20 to 40.

4. The composition of matter as defined by claim 1, wherein the condensate (iv) of the oligoester with the unsaturated polyester is present in an amount representing 0.5 to 5% by weight of the mixture of unsaturated polyester (i) + polymerizable monomer (ii) + oligoester (iii).

5. The composition of matter as defined by claim 1, wherein the unsaturated polyester (i) has an acid number in an alcoholic medium ranging from 10 to 75, a hydroxyl number ranging from 20 to 80 and a number-average molecular weight ranging from 1,000 to 5,000.

6. The composition of matter as defined by claim 5, wherein the ethylenically unsaturated monomer (ii) comprises from 10 to 60% of the total weight of the polyester (i) + monomer (ii).

7. The composition of matter as defined by claim 6, wherein the oligoester (iii) comprises up to 30% of the total weight of the polyester (i) + ethylenically unsaturated monomer (ii).

8. The composition of matter as defined by claim 1, wherein the oligoester (iii) of the formula (I) is the reaction product of 1.7 to 2 mols of maleic anhydride with one mol of the polyether-polyol HO—R—$O_m$—ROH.

9. The composition of matter as defined by claim 8, wherein the number-average molecular weight of the polyetherpolyol HO—R—$O_m$—ROH ranges from 1,000 to 4,000 and the acid number of the said oligoester in an aqueous medium and its acid number in an alcoholic medium range from 25 to 100, the difference between the aqueous acid number and the alcoholic acid number, for the same oligoester, being at most 5.

10. The composition of matter as defined by claim 2, said oligoester of the formula (I) having an acid number in an aqueous medium and an acid number in an alcoholic medium ranging from 40 to 70.

11. A molding compound comprising a composition of matter as defined by claim 1.

12. The molding compound as defined by claim 11, further comprising a thickener, a filler, a reinforcing fiber, a catalyst, a polymerization inhibitor, or admixture thereof.

13. A shaped article comprising the composition of matter as defined by claim 1.

14. A shaped article comprising the molding compound as defined by claim 11.

* * * * *